United States Patent [19]

Schäfer et al.

[11] 3,979,548
[45] Sept. 7, 1976

[54] POLYURETHANE COATED SAFETY GLASS

[75] Inventors: Wolfgang Schäfer; Helmer Raedisch, both of Aachen, Germany

[73] Assignee: Saint-Gobain Industries, Neuilly-sur-Seine, France

[22] Filed: Nov. 12, 1974

[21] Appl. No.: 523,016

[30] Foreign Application Priority Data
Nov. 16, 1973 France .............................. 73.40821

[52] U.S. Cl. ................................ 428/425; 428/437; 260/77.5 A; 260/77.5 AP; 427/165
[51] Int. Cl.² .......................................... B32B 27/40
[58] Field of Search ........................ 428/425, 437; 260/77.5 A, 77.5 AP

[56] References Cited
UNITED STATES PATENTS

| 3,657,057 | 4/1972 | Shorr et al. | 428/437 |
| 3,671,370 | 6/1972 | Littell, Jr. | 428/437 X |
| 3,791,914 | 2/1974 | Ammons et al. | 428/425 |
| 3,804,810 | 4/1974 | Fryd | 428/425 X |
| 3,806,486 | 4/1974 | Endriss et al. | 428/425 X |

FOREIGN PATENTS OR APPLICATIONS
2,058,504   6/1972   Germany

Primary Examiner—Harold Ansher
Assistant Examiner—Patricia C. Ives
Attorney, Agent, or Firm—Pennie & Edmonds

[57] ABSTRACT

A scratch-resistant polyurethane coating for safety windows is made by curing a sheet of a liquid composition comprising (1) a polyglycol ether resulting from the condensation of propylene oxide with trimethylolpropane and containing 10.5%–12.0% free hydroxyls and (2) a biuret of 1,6-hexamethylene-diisocyanate, having 21–22% isocyanate groups, the weight ratio of said biuret to said polyglycol ether being about 0.9–1.1.

2 Claims, 6 Drawing Figures

POLYURETHANE COATED SAFETY GLASS

BACKGROUND OF THE INVENTION

A prime objective of this invention is to provide a polyurethane coating which is scratch-resistant, even when it is manufactured under temperature conditions of 90°C or higher.

In the copending and commonly assigned application for U.S. patent Ser. No. 369,087 filed June 11, 1973, there is described the use of scratch-resistant plastic coatings on the interior surface of safety glass for automobiles and the like, and in particular the use of weakly cross-linked aliphatic polyurethanes to form such coatings.

According to this prior copending application such coatings should have the following properties:

| | |
|---|---|
| Modulus of elasticity about | 1,000 kg/cm$^2$ |
| Mean modulus of deformation | 200 kg/cm$^2$ |
| Elongation at break | 100% |
| Breaking strength | 100 kg/cm$^2$ |
| Plastic deformation, expressed as percentage of total elongation at break | 2% |

Such polyurethane coatings are made by curing liquid mixtures comprising two constituents, namely (1) an aliphatic polyether having free (i.e. reactive) hydroxyl groups and (2) an aliphatic polyisocyanate having reactive isocyanate groups. The liquid mixture is cast into a sheet which is then cured, whereby hydroxyl groups of the polyether molecules react with isocyanate groups of the aliphatic isocyanate molecules to form a three-dimensional cross-linked polyurethane structure.

In German published application No. 2,058,504 there is described an exemplary mode of preparing polyurethanes of this type in which component (1) is a polyglycol ether resulting from the condensation of propylene oxide with trimethylolpropane and in which component (2) is a biuret of 1,6-hexamethylene-diisocyanate. In example III of this German application a coating is prepared by curing a mixture of 128 parts by weight of such a biuret together with 100 parts by weight of such a polyglycol ether. Since this application is silent as to the relative percentages of reactive hydroxyls and isocyanates respectively in the two components it is not clearly defined how close to the stoichiometric these proportions are.

The general teaching of the prior art is vague in regard to the stoichiometry desirable in forming polyurethanes from polyols and polyisocyanates. For example, U.S. Pat. No. 3,791,914 states that ordinarily the amount of polyisocyanate utilized is sufficient to react one equivalent of isocyanate per hydroxyl equivalent of the polyol; but that this ratio is not critical "except for obtainment of optimum results, higher or lower amounts being employed without adverse results".

The present applicants have found that stoichiometrically equivalent proportions are disadvantageous when a high temperature such as about 90°C or higher is used in affixing the polyurethane plastic sheet to the glass. Such higher temperature is required particularly when the outer layer of polyurethane is affixed simultaneously with lamination of two or more glass sheets interlayered with polyvinylbutyral. The temperature required for such an assembly is between about 120° and 140°C. During such high heat conditions, the physical properties of the outside polyurethane sheet deteriorate. In particular, the scratch-resistance is substantially reduced.

Specifically, present inventors have observed the above described results when polyurethane coatings were prepared from mixtures of 100 parts by weight of a component (1) being a polyglycol ether resulting from the condensation of propylene oxide with trimethylolpropane and having 10.5–12% free hydroxyls, together with 128 parts by weight of (2) a biuret of 1,6-hexamethylene-diisocyanate having 21–22% isocyanate groups. The weight ratio $W_2/W_1$ of components (2) to component (1), equal to 1.28, corresponds approximately to a stoichiometric equivalence between the available isocyanate and hydroxyl groups respectively.

Using a mar test to be described in greater detail below, a coating prepared from this composition by curing at a temperature below 90°C, has a normal scratch-resistance equal to about 30 grams. But after a treatment at 90°C for a half-hour, the scratch-resistance decreases to about 2 grams. This reduction is so great as to make the product unsuitable for use on the interior surface of a safety windshield in a motor vehicle. The surface layer has become too rigid and too readily scratched.

SUMMARY OF THE INVENTION

Applicants have found that the aforedescribed deficiencies can be overcome simply by changing the ratio of the same components (1) and (2) so that $W_2/W_1$ is approximately equal to 1; i.e. approximately equal weights of the same polyglycol ether and polyisocyanate are used.

Briefly stated, the present invention comprises curing a sheet of a liquid composition containing (1) a polyglycol ether resulting from the condensation of propylene oxide with trimethylolpropane and having 10.5–12% free hydroxyls and (2) a biuret of 1,6-hexamethylene diisocyanate having 21–22% isocyanate groups, the weight ratio of said biuret to said polyglycol ether being about 0.9–1.1.

The present invention relates also to a safety window comprising at least one glass sheet having bonded thereto a scratch-resistant layer of the polyurethane of this invention.

This invention relates also to a safety glass laminate of a plurality of solid glass sheets having disposed between adjacent sheets an adherent, transparent interlayer of polyvinylbutyral and having bonded to at least one outer glass sheet of this laminate an adherent solid transparent layer of the scratch-resistant polyurethane of this invention.

DETAILED DESCRIPTION

It thus appears surprisingly that a better durability of mar-resistance on exposure to high temperatures is obtained by departing from a stoichiometric ratio, with an excess of hydroxyls over isocyanates. Normally, one would expect such a less rigid and incompletely cross-linked structure to be more easily scratched. Mechanical characteristics in general are also made more durable to heat treatment, as will appear from examination of the annexed drawings, in which.

Figure 4:
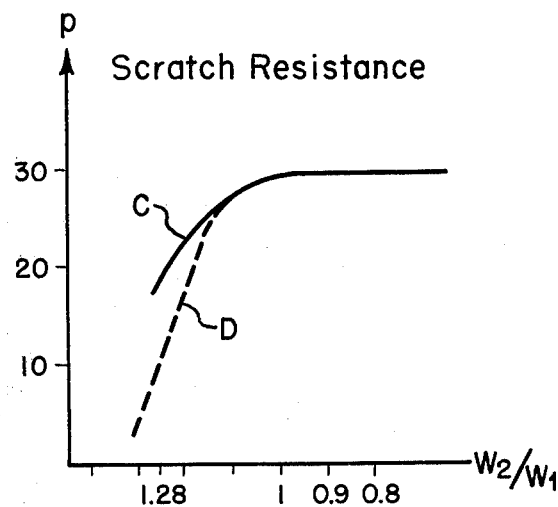

FIG. 4 is a graph of the variation of scratch-resistance expressed in ponds as a function of the same ratio $W_2/W_1$. Scratch-resistance was measured with an instrument, Type 413, manufactured by the firm Erichsen at Hemer. This instrument involves a diamond-pointed stylus which can be loaded with various weights and which moves in a circular path over the surface whose resistance to scratching is to be evaluated. The minimum weight which produces permanent scratches constitutes a measure of the resistance of the surface to scratching.

In these four graphs, the unbroken curves C present the values obtained on samples not subjected to any temperatures above 90°C, whereas the broken curves D present the values obtained on corresponding samples submitted to higher temperatures, exemplarily to 90°C for 1 hour. It is to be emphasized that a temperature around 90°C is a threshold beyond which there is little further change in the respective physical properties. Thus, values obtained for samples exposed to temperatures up to 140°C, for example, fit on the same broken lines. Thus, the broken curves shown are sufficient to show the effect of thermal treatment in general.

If a temperature higher than 90°C. is used, the time required to achieve maximum rigidity is simply shortened, but values of the physical properties finally reached are substantially the same.

Figure 1:
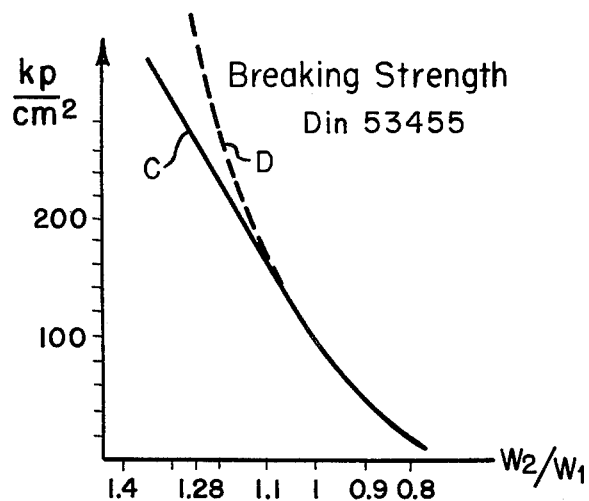
FIG. 1 shows the variation in breaking strength, expressed in kiloponds per square centimeter (or kilograms of force per square centimeter), of the cured polyurethane sheeting as a function of the above defined weight ratio $W_2/W_1$ of components (2) to (1). The breaking strength was measured according to German Industrial Standards DIN 53455.

It will be observed in FIG. 1 that a heat treatment about 90°C. (curve D) increases breaking strength substantially when the ratio $W_2/W_1$ is greater than about 1.1, whereas when $W_2/W_1$ has the values of this invention, between 0.9 and 1.1, heat treatment has no influence on the breaking strength and curves C and D coincide.

Figure 2:
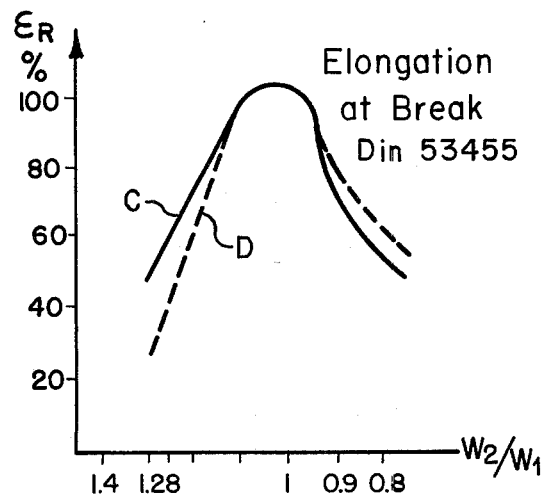
FIG. 2 is a graph of the variation in elongation at break, expressed in percent of original length, as a function of the same ratio $W_2/W_1$. The standard tests were likewise made in accordance with DIN 53455.

The data on elongation to break presented graphically in FIG. 2 show that an optimum value of 100% or more elongation to rupture is obtained even after heat treatment, when the value of $W_2/W_1$ is in the vicinity of unity, but that there is a substantial deviation of the D-Curve from the C-Curve when $W_2/W_1$ rises above or falls below the unity value.

Figure 3:
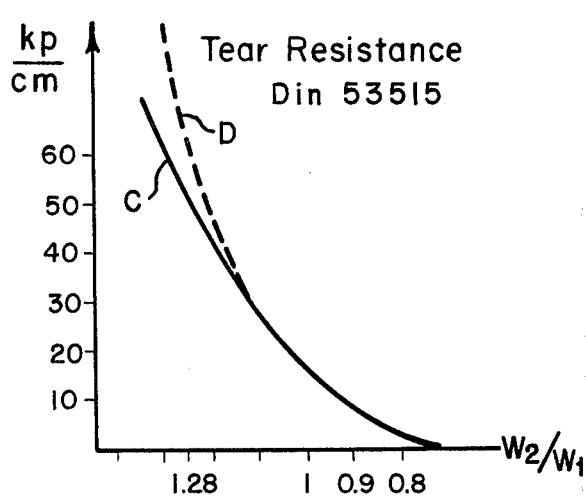
FIG. 3 is a graph of the variation of tear resistance as a function of $W_2/W_1$. The tear resistance was measured according to German Industrial Standards DIN 53515 and is again expressed in kiloponds per centimeter.

The tear resistance curves of FIG. 3 have, as is to be expected, the same general shape as those of FIG. 1. These curves show that better initial tear resistance is obtained as the ratio $W_2/W_1$ increases to the 1.28 corresponding to stoichiometric equivalence, and beyond; and that the exposure to heat actually increases the tear resistance. However, this advantage is obtained to the detriment of the other properties as is apparent from FIGS. 1, 2 and 4. Applicant has determined that the tear resistances obtained when $W_2/W_1$ is between 0.9 and 1.1 (and which are unchanged by heat treatment) are commercially acceptable in the utilization of these layers, particularly when coating safety glass on the surface facing the interior of a vehicle.

The curves of FIG. 4 show clearly the advantage obtained by the process of this invention. It is evident that products with $W_2/W_1$ substantially exceeding unity have significantly diminished scratch-resistance even without high heat treatment (Curve C) and that heat treatment at greater than 90°C. substantially decreases this resistance by amounts which make the product commercially unacceptable. In particular a ratio of $W_2/W_1 = 1.28$, corresponding to stoichiometric equivalence, is completely unsatisfactory.

The overall thrust of the information in these figures is that the weight ratio of polyglycol ether to biuret components of the composition of this invention should be selected between 0.9 and 1.1, preferably close to unity, in order to make a laminate of the cured polyurethane on glass which can be subjected to high temperatures. It may be confidently predicted that this region of composition is also advantageous even when the layer is not subjected to a high temperature treatment, inasmuch as it is well known that the deterioration process which takes place at elevated temperatures involves an acceleration of aging phenomena which take place more slowly at lower temperatures.

Figure 5:
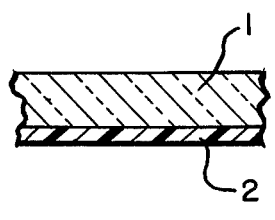
Figure 6:
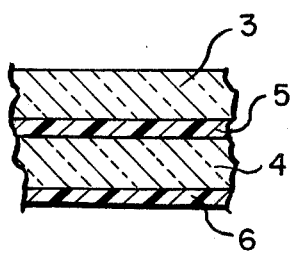

FIGS. 5 and 6 illustrate assemblies in which the scratch-resistant coating of this invention is bonded to a glass sheet. In FIG. 5 there is exemplarily one glass sheet 1 and one layer 2 of the polyurethane coating of this invention adhered thereto. In FIG. 6 there is illustrated an assembly of at least two sheets 3 and 4 of glass having disposed between them sheets of an adherent transparent interlayer 5 of polyvinylbutyral and having bonded to at least one outer glass sheet of this laminate an adherent solid transparent layer 6 of the scratch-resistant polyurethane of this invention.

In preparing the polyurethane coating composition from a mixture of components 1 and 2, it is advantageous to include also an accelerator. Substances which are particularly suitable as accelerators are the dialkyltin carboxylates and stannous carboxylates, including exemplarily dibutyltin di-(2-ethylhexoate), dibutyltin dilaurate, stannous oleate and stannous octoate. Zinc carboxylates such as zinc octoate or zinc naphthenate can also be used. Dibutyltin is preferred.

Since the accelerator can also catalyze the aging of the cured film, the weight proportion of accelerator, based on the polyglycol component 1, should not be greater than about 0.1%. It is preferred that the weight ratio of accelerator to component 1 should be between about 0.01 and 0.07%. The most suitable value of such ratio is about 0.045–0.055%.

It is also suitable, as known, to add along with the accelerator an antioxidant stabilizer, for example one of the polyalkylphenols having sterically hindering substituent groups in one or both of the ortho positions. A particularly suitable stabilizer is 2,6-di(tert.butyl)-p-cresol. The weight percentage of stabilizer, based on the polyglycol component 1 can be between 0 and 5%, suitably between 1 and 5%, the preferred percentage being about 2–2.5%.

EXAMPLE OF THE INVENTION

To achieve a polyurethane coating composition according to this invention, a mixture is made, at a temperature between about 20° and 50°C., as follows: To the mixing vessel there is first added 1000 grams of the polyglycol ether resulting from the condensation of propylene oxide with trimethylolpropane, having a molecular weight about 450 and containing 10.5–12% free hydroxyls. To this polyglycolether there is added 23 grams of 2,6-di(tert.butyl)-p-cresol as stabilizer and 0.5 grams of dibutyltin dilaurate as accelerator. When these ingredients are well-mixed, there is further added 1000 grams of the biuret of 1,6-hexamethylene diisocyanate having 21–22% isocyanate groups.

A homogeneous mixture is obtained by stirring carefully to avoid the formation of air-bubbles or blisters.

This liquid mixture is then cast into a film by pouring on to a substrate or support exemplarily of glass, where it polymerizes or cures to acquire its characteristic film structure. The curing or drying time, which is 24 hours at 20° C., can be reduced to 15 minutes by heating at 140° C. If it is desired to remove the layer of cured film from its support, the surface of the glass or other support is advantageously first treated with a release agent such as magnesium stearate.

The cured coating or film prepared in this manner has the following properties:

| Breaking strength | 100–140 kg/cm$^2$ |
| Elongation at break | 100–135% |
| Tear Resistance | 15 kg/cm |
| Scratch Resistance | 25–30 grams |

A particular advantage of the liquid composition of this invention is its relatively low and manageable viscosity before curing.

If, contrary to the teaching of the instant invention, the weights $W_1$ and $W_2$ respectively of components 1 and 2 are used in proportion so that $W_2/W_1 = 1.28$ (i.e. 128 parts by weight of component 2 are mixed with 100 parts by weight of component 1, it is extremely difficult to operate without addition of solvent because the viscosity of this mixture is 4,600 centipoises at 20°C. On the other hand when the ratio of $W_2/W_1 = 1.00$ as in this example of the instant invention, the liquid composition has a viscosity of only 2,800 centipoises at the same temperature.

It is of course possible to decrease the working viscosity of prior-art compositions by adding solvents. However, this gives rise to other disadvantages. The time required for drying and curing is prolonged. More elaborate drying equipment is necessary, including installations for solvent recovery. Additional expenses are involved both for building the equipment and for operating with the elevated output of heat energy needed.

Furthermore, in addition to these disadvantages in handling, it is extremely difficult to eliminate solvent residues completely, giving rise to deficiencies in the final curing at elevated temperatures such as blistering and non-uniformity of adhesion.

By avoiding the necessity of resorting to solvents, the compositions of the instant invention are substantially improved over the prior art.

We claim:

1. A safety window comprising at least one glass sheet having bonded thereto an adherent solid transparent layer of a scratch-resistant polyurethane formed by curing a liquid mixture containing (1) a polyglycol ether resulting from the condensation of propylene oxide with trimethylolpropane and containing about 10.5–12% by weight free hydroxyls together with (2) a biuret of 1,6-hexamethylene diisocyanate having about 21–22% by weight isocyanate groups, the weight of said biuret being between about 0.9 and 1.1 times the weight of said polyglycol ether.

2. A safety glass laminate of a plurality of solid glass sheets having disposed between adjacent sheets an adherent, transparent solid interlayer of polyvinylbutyral and having bonded to at least one outer glass sheet of this laminate an adherent solid transparent layer of scratch-resistant polyurethane formed by curing a liquid mixture containing (1) a polyglycol ether resulting from the condensation of propylene oxide with trimethylolpropane and containing about 10.5–12.0% by weight free hydroxyls together with (2) a biuret of 1,6-hexamethylene diisocyanate having about 21–22% by weight isocyanate groups, the weight of said biuret being between about 0.9 and 1.1 times the weight of said polyglycol ether.

* * * * *